United States Patent [19]

Lampe

[11] 4,410,677

[45] Oct. 18, 1983

[54] LOW MODULUS ROOM TEMPERATURE VULCANIZABLE SILICONE RUBBER COMPOSITIONS

[75] Inventor: Warren R. Lampe, Ballston Lake, N.Y.

[73] Assignee: General Electric Company, Waterford, N.Y.

[21] Appl. No.: 479,342

[22] Filed: Mar. 28, 1983

Related U.S. Application Data

[63] Continuation-in-part of Ser. No. 927,787, Jul. 25, 1978, abandoned.

[51] Int. Cl.$^3$ ............................................. C08G 77/04
[52] U.S. Cl. ..................................... 528/17; 524/265; 524/267; 524/588; 524/731; 528/18; 528/19; 528/33; 528/34
[58] Field of Search ...................... 528/34, 33, 17, 18, 528/19; 524/731, 265, 267, 588

[56] References Cited

U.S. PATENT DOCUMENTS

| | | | |
|---|---|---|---|
| 2,938,009 | 5/1960 | Lucas | 524/588 |
| 3,240,731 | 3/1966 | Nitzsche et al. | 528/34 |
| 3,296,161 | 1/1967 | Kulpa | 528/15 |
| 3,382,205 | 5/1968 | Beers | 528/34 |
| 4,100,129 | 7/1978 | Beers | 528/34 |

*Primary Examiner*—Melvyn I. Marquis

[57] ABSTRACT

A low modulus room temperature vulcanizable silicone rubber composition with a good shelf life comprising a silanol containing polysiloxane, a filler, an acyloxy functional silane as the cross-linking agent and as the catalyst a compound which is selected from the class consisting of zinc salts and zirconium salts or a co-catalyst system comprising as one co-catalyst a tin salt of carboxylic acid and as the other co-catalyst either a zinc salt or a zirconium salt of a carboxylic acid.

34 Claims, No Drawings

LOW MODULUS ROOM TEMPERATURE VULCANIZABLE SILICONE RUBBER COMPOSITIONS

This application is a continuation-in-part of application Ser. No. 927,787, filed July 25, 1978 and now abandoned.

BACKGROUND OF THE INVENTION

The present invention relates to a room temperature vulcanizable silicone rubber composition and more particularly the present invention relates to a low modulus room temperature vulcanizable silicone rubber composition with a good shelf life which results from the use of certain specific catalyst systems.

Sealants are well known. A sealant and specifically a sealant that is utilized in high rise construction must adhere to the substrate to which it is applied and preferably has elastomeric properties. The use of such sealants in high rise construction is well known in that such sealants are applied where the window pane meets the building so as to seal the glass to the metal frame providing a weathertight seal. In addition and especially in high rise construction there are many areas in which the sealant is desirable for sealing the materials against the elements of weathering so as to prevent moisture and dirt from entering the building once the sealant is used to seal the window pane to the metal frame. Many sealants are used for such an application and specifically polysulfides.

Further, it is especially desirable that the sealant be an elastomer in its cured form, that is, it can be compressed and expanded, that is, it has elasticity and an elastic memory. It is desirable that the sealant be in the form of a true elastomer since it then will expand and contract in the joint in which it is located and, thus, will continue to seal against the elements of weathering.

It should be noted that in some such sealant applications there is preferred a sealant of high tensile strength and good adhesion to the substrate. This is the application where toughness of the sealant is of primary importance and the lack of elasticity of the sealant is not that important. Such sealant applications which are small necessarily apply to the sealing of joints in which there is a small joint movement. Where the sealant is to accommodate fairly large relative expansion and contraction of a joint opening, then it is preferable to utilize a low modulus sealant. A low modulus sealant means a sealant which has a moderate tensile strength, but a high per cent elongation. Such sealants may be made tougher by the incorporation in them of a treated filler. However, the important property in the sealant is its per cent elongation and, thus, it is desirable that the sealant will be able to compress or expand at least 25% of the distance of the thickness of the joint or more preferably be able to expand and compress by 50% of the thickness of the joint. The more the sealant can expand and compress in terms of the thickness of the joint, or of its own thickness, the more desirable it is, as long as the sealant has some adhesion to the substrate, that is, it does not withdraw or release from the substrate when it expands or contracts. One class of such sealants useful in high rise construction are one component room temperature vulcanizable silicone rubber sealants. An example of such a sealant is for instance to be found disclosed in U.S. Pat. No. 3,296,161. This patent discloses the use of a dialkoxydiacyloxysilane additive to improve the bond strengths of a one component room temperature vulcanizable silicone rubber acyloxy system. Another patent which discloses such a sealant is for instance that of Beers U.S. Pat. No. 3,382,205 which discloses a room temperature vulcanizable silicone rubber composition comprising as an additive for improving the adhesion and/or lowering the modulus of a composition, a fluid which is composed of $R_2SiO$ units $R\,SiO_{3/2}$ units and $R_3SiO_{1/2}$ units where R is a monovalent hydrocarbon radical.

It should be noted that the above are additives to one component room temperature vulcanizable silicone rubber compositions. Such a one part RTV composition (RTV shall be used hereinafter to refer to room temperature vulcanizable silicone rubber compositions) comprise a silanol terminated diorganopolysiloxane polymer where the organo groups are monovalent hydrocarbon radicals, a filler which is selected from reinforcing or extending fillers (which fillers can be treated and untreated-an example of a reinforcing filler being fumed silica) and a cross-linking agent which is preferably methyltriacetoxy silane although it can be any alkyl triacyloxy silane. There is preferably utilized a catalyst with such systems to expedite the cure and such a catalyst is preferably the metal salt of a monocarboxylic acid where the metal varies from lead to manganese in the Periodic Table.

The basic ingredients of the silanol polymer, the filler, the acyloxy crosslinking agent and the metal salt of carboxylic acid are simply mixed under anhydrous conditions. When it is desired to cure the system, the mixture is simply applied and exposed to atmospheric moisture whereupon it cures to a silicone elastomer with a release of acetic acid. In the case where the cross-linking agent is methyltriacetoxy silane, there are many additives that can be added to such a composition to change its properties. The foregoing patents that were disclosed above of Beers '205 Patent and the Kulpa '161 Patent disclosed two additives which may be added to such a system to improve its properties in the case of Kulpa being the adhesion promoter and in the case of the additive of Beers, it being an enhancement of adhesion promotion, as well as lowering the modulus of the system.

In the case of such sealant compositions without major modification of the ingredients, there results a silicone sealant which has plus or minus 25% extension and compression in the joint in which it is placed, of a joint 1/16 to 1 inches wide. Accordingly, it is highly desirable to modify such a traditional sealant of the composition disclosed previously and specifically silicone sealant of the composition disclosed previously, such that it has a plus or minus 50% compression and extension in joints whose width varies from 1/16 to 1 inch.

There are many ways for lowering the modulus of an acyloxy functional silicone sealant, or other silicone sealants for that matter.

One modification that may be made to the silicone sealant is to increase the viscosity or molecular weight or polymer chain length of the base silanol terminated diorganopolysiloxane polymer. It should be noted that the increasing of the viscosity, increasing the molecular weight and increasing the polymer chain length all mean the same thing; that is, by increasing the viscosity, the molecular weight of the polymer is increased which makes the final silicone elastomer more elastic and thus it has a lower modulus. The longer polymer chains will not be as highly cross-linked as shorter polymer chains and as such the silicone elastomer that is formed from the longer polymer chains will be more elastic or have a lower modulus. Another way of decreasing the modulus is to use an extending oil in the composition that is a diorganopolysiloxane polymer which is unreactive to the system and which simply acts as a plasticizer. This again will make the composition more elastic and lower the modulus of the cured system. Another way of lowering the modulus of the system is to add the fluid of the Beers U.S. Pat. No. 3,382,205, such a fluid acts as a chainstopping fluid, thus, lowering the amount of crosslinking that is carried out by the acyloxy functional silane crosslinking agent. The lower crosslinking makes the cured composition more elastic and thus allows it to have a lower modulus.

Finally, fumed silica or precipitated silica that is a reinforcing filler may be added to the composition and preferably such reinforcing filler is treated so as to increase the tensile product of the composition, i.e., the toughness of the composition. Accordingly, all of the above modifications may be made to one component acyloxy functional RTV system, such that it has the plus or minus 50% desired compression and expansion in the joints.

Accordingly, it is highly desirable to formulate an acyloxy functional silicone sealant which has the foregoing low modulus so as to meet the specific compression and expansion requirement set forth above. However, it has been found that when such is done or carried out that the shelf life of the compositions suffer, that is, the composition will have a shelf life of anywhere from 6 months to 9 months, and after that time may cure very slowly or not cure at all. It is also noted that when the sixth or ninth month period is passed, the composition will have a tack-free time that is exceedingly long which is undesirable.

Accordingly, it is one object of the present invention to provide for a low modulus, one package RTV acyloxy functional sealant, which has a good shelf life, that is a shelf life of one year or more.

It is another object of the present invention to provide for a low modulus acyloxy functional one component RTV sealant which has a shelf life of 18 to 27 months.

It is an additional object of the present invention to provide for a composition of a one component acyloxy functional RTV composition which when applied to a joint width of a specified size will have plus or minuss 50% compression and expansion, that is, it is a low modulus silicone sealant which has a short tack-free time and a long shelf life.

It is still an additional object of the present invention to provide for the process of producing a low modulus one component acyloxy functional RTV sealant which will have a short tack-free time and a long shelf life. These and other objects of the present invention are accomplished by means of the disclosure set forth hereinbelow.

In accordance with the above object, there is provided by the present invention a low modulus room temperature vulcanizable silicone rubber composition with a good shelf life comprising (A) a first mixture of (1) 100 parts by weight of a silanol terminated diorganopolysiloxane polymer with a viscosity varying from 50,000–350,000 centipoise at 25° C. where the organic groups are monovalent hydrocarbon radicals; (2) from 0 to 100 parts by weight of a filler; and (B) a second mixture where there is utilized from 1 to 20 parts; by weight of the second mixture per 100 parts of the first mixture of (3) from 60 to 100 parts by weight of an acyloxy functional silane of the formula,

RSi(OCOR')$_3$ where R and R' are monovalent hydrocarbon radicals and (4) from 0.1 to 5 parts by weight of a catalyst selected from the class consisting of zinc salts of carboxylic acid, zirconium salts of carboxylic acid and mixtures thereof.

Such compositions while having a good cure and a good shelf life for extended periods of time such as 18 months to 27 months after they are prepared, nevertheless have an extended back-free time, such as 40 to 60 minutes. If it is desired to have a low modulus composition with a good shelf life and a good cure after a period of time of 18 months to 27 months, there is utilized in the mixture (B) in the composition above in addition to the acyloxy functional silane a co-catalyst system. Such a co-catalyst system contains from 0.5 to 5 parts by weight of a tin salt of a carboxylic acid and from 0.001 to 0.4 parts by weight of a co-catalyst selected from the class consisting of a zinc salt of a carboxylic acid and zirconium salt of a carboxylic acid. As pointed out previously, such a co-catalyst system unlike the first catalyst system has a good shelf life, that is the composition will cure after 18–27 months after it has been prepared and will have a short tack-free time of 20 minutes or less; unlike the extended tack-free time of the composition of the first catalyst system. One type of tin salt that can be utilized in the co-catalyst system is dibutyltindilaurate. A much more preferred tin salt which give the advantageous tack-free time in the instant compositions is dimethyl tin neo-decanoate. The preferred zirconium salt is zirconium octoate while the preferred zinc salt is zinc octoate. Other zinc salts and zirconium salts would operate just as effectively in the instant invention. The above compositions may contain any of a number of well-known additives as will be described below.

DESCRIPTION OF THE PREFERRED EMBODIMENT

The base polymer of the one component room temperature vulcanizable silicone rubber composition of the instant case comprises a silanol terminated diorganopolysiloxane polymer having the viscosity varying from 50,000 to 350,000 centipoise at 25° C. and more preferably has a viscosity that varies 100,000 to 250,000 centipoise at 25° C.

It should be noted of course that the higher the viscosity of the base polymer, the lower the modulus of the resulting composition. The organo groups of said diorganopolysiloxane polymer can be selected from any monovalent hydrocarbon radical and halogenated monovalent hydrocarbon radical. Examples of substituent groups which the organo radical can stand for, for instance alkyl radicals, such as methyl, ethyl, propyl of 1 to 8 carbon atoms; cycloalkyl radicals such as cyclohexyl, cycloheptyl, etc. of 4 to 8 carbon atoms, mononuclear aryl radicals such as phenyl, methylphenyl, ethylphenyl, etc.; and alkenyl radicals such as vinyl, allyl, etc.

In addition, the organo groups in such diorganopolysiloxane polymer can stand for halogenated monovalent hydrocarbon radicals such fluoroalkyl radicals are for instance 3, 3, 3 trifluoropropyl. Such diorganopolysiloxane polymer is preferably 100% a linear diorganopolysiloxane polymer. However, up to 0.1 by weight of combined monofunctional siloxy units and trifunctional siloxy units can be tolerated in the polymer. That is, the combined monofunctionality and trifunctionality of siloxy units cannot exceed 0.1% by weight. Preferably the linear diorganopolysiloxane polymer has the formula,

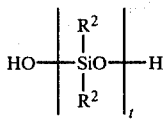

where $R^2$ is selected from monovalent hydrocarbon radicals and halogenated monovalent hydrocarbon radicals, which are the same as the radicals given as examples for the organo radicals above and where t varies such that the polymer has a viscosity varying from 50,000 to 350,000 centipoise at 25° C. and more preferably has a viscosity varying from 100,000 to 250,000 centipoise at 25° C.

The production of such silanol terminated diorganopolysiloxane polymers is well known in the art. Briefly, there is taken diorganodichlorosilanes with up to 10% by weight of monofunctionality or trifunctionality and the chlorosilanes are hydrolyzed in water. The resulting hydrolyzate is then taken and the water separated from it and there is added to it, anywhere from 1 to 5% by weight of potassium hydroxide. The hydrolyzate is heated at temperatures of over 100° and preferably 150° C. for a period of time varying anywhere from 1 to 8 hours so as to preferentially form cyclopolysiloxanes.

It should be noted that the hydrolyzate mixture as obtained from the water hydrolysis contains in it low molecular weight cyclopolysiloxanes as well as low molecular weight silanol terminated diorganopolysiloxane polymers. By cracking such a hydrolyzate with potassium hydroxide at elevated temperatures most of the contents of the silicone hydrolyzate is predominately converted to the cyclotetrasiloxanes. The foregoing cyclotetrasiloxanes are then taken and they are mixed together and there is added to such cyclotetrasiloxanes anywhere from 50 to 500 parts per million of potassium hydroxide and the desired amount of water as a chainstopper. The resulting mixture is then heated at elevated temperatures so as to preferentially form at above 100° and more preferably above 150° C. in an equilibration reaction that desired silanol terminated diorganopolysiloxane polymer. The final viscosity of the polymer that is formed will depend on the amount of water that is added as a chainstopper. The more water that is present as a chainstopper then the lower the molecular weight of the silanol terminated diorganopolysiloxane polymer that will be formed. The less water that is added, the higher the molecular weight of the silanol terminated diorganopolysiloxane polymer that will be formed.

In addition to the water there may be utilized as a chainstopper, low molecular weight silanol terminated diorganopolysiloxane polymers, that is the polymers that are obtained when the diorganodichlorosilanes are hydrolyzed in water. When the desired amount of silanol terminated diorganopolysiloxane polymer has been formed in the equilibration reaction, then the alkali metal hydroxide catalyst, that is the potassium hydroxide is neutralized, and the unreacted cyclics are stripped off to yield the desired base polymer.

It should be noted that the process for forming the silanol terminated diorganopolysiloxane polymer having fluoroalkyl substituted groups differs from the process for producing the diorganopolysiloxane polymers having non-halogenated substituent groups in that the fluoroalkyl substituted polymer can be produced both from cyclotrisiloxanes as well as from cyclotetrasiloxanes. The process of the production of the polymer from the cyclotrisiloxanes is preferred since that results in a maximum conversion of the cyclic trisiloxanes to the desired polymer.

In accordance with the present invention there is utilized per 100 parts by weight of the base silanol terminated polymer of from 0 to 100 parts by weight of a filler and more preferably from 10 to 30 parts by weight of a filler. If a filler is included, it can be selected from reinforcing fillers or from extending fillers. The reinforcing fillers as is well known, are formed silica and precipitated silica. The reinforcing fillers are preferred in the composition, if it is desired to increase the tensile strength of the cured silicone elastomer. The disadvantage of the reinforcing fillers, however, is that they unduly increase the viscosity of the uncured composition and decrease its elongation properties. Such effects can be alleviated by treating the filler as will be explained hereinbelow.

If it is desired to increase the tensile strength of the composition to some extent, without unduly increasing the viscosity of the uncured composition and without unduly decreasing the elongation, there may be incorporated an extending filler into the composition in the above concentrations. Examples of extending fillers are for instance titanium dioxide, zirconium silicate, silica aerogel, iron oxide, diatomaceous earth, glass fibers, polyvinyl chloride, ground quartz. Other examples of extending fillers that can be utilized are lithopone, zinc oxide, calcium carbonate, magnesium oxide, chronic oxide, zirconium oxide, aluminum oxide, alpha quartz, calcined clay, carbon, graphite, quartz, cotton synthetic fibers, etc.

In accordance with the instant case, it is preferred, the filler that if utilized, be of a reinforcing type and specifically of fumed silica, since even a small quantity of such fumed silica will increase the tensile strength and toughness of the final elastomer sealant.

Further if such fumed silica is utilized in small enough quantities, it will not unduly decrease the percent elongation of the cured elastomer. To prevent the filler from decreasing the percent elongation of the cured composition and also to prevent the filler from increasing the viscosity of the uncured composition to undesirable levels, the filler is preferably treated. Thus, the silica filler may be treated as for example as disclosed in U.S. Pat. No. 2,938,009 Lucas with cyclicpolysiloxanes. Another method for treating fillers that can be utilized in the invention of the instant case is that disclosed in Brown U.S. Pat. No. 3,024,126, the disclosure of both patents being incorporated into the present case by reference.

In addition silazane treated fillers in accordance with the disclosure of Smith U.S. Pat. No. 3,635,743 and Beers U.S. Pat. No. 3,837,878 are preferred as treated fillers in the instant invention. However, the most preferred treated filler in the instant invention is fumed silica treated with cyclopolysiloxanes and more specifically with cyclotetrapolysiloxanes such as octamethylcyclotetrasiloxane.

The above silanol terminated diorganopolysiloxane polymer forms, with the optional filler, the base mixture of the instant composition. To 100 parts of the base mixture there is added in accordance with the instant invention from 1 to 20 parts by weight of a catalyst mixture wherein the catalyst mixture is generally composed of a crosslinking agent, the adhesion promoter and the true catalyst that accelerates the reaction. There is used from 1 to 20 parts by weight of the catalyst mixture per 100 parts of the base mixture. The mixture of the silanol terminated diorganopolysiloxane polymer and optional filler can be considered to be the first mixture or base mixture, and preferably there is utilized 1 to 10 parts by weight of the catalyst mixture or second mixture per hundred parts by weight of the first mixture and in such catalyst mixture there will be anywhere from 60 to 100 parts by weight of an acyloxy functional silane of the formula, $$R\ Si\ (OCOR')_3$$

where R and R' are monovalent hydrocarbon radicals and are preferably alkyl radicals of 1 to 8 carbon atoms, phenyl radicals and most preferably methyl radicals. The above acyloxy functional silane is the crosslinking agent in the instant composition. The most preferred and most common of such crosslinking agents is, of course, methyltriacetoxy silane. There is no need to explain the workings of such a crosslinking agent or how it is obtained since such is well-known to a worker skilled in the art. The catalyst that may be utilized with such acyloxy functional silane crosslinking agent is a tin salt of carboxylic acid such as for instance dibutyl tin dilaurate or tin neodecanoate. However, as stated previously when the composition is desired to be low modulus and there is utilized the above tin catalyst, the composition had an impermissible shelf life, that is a shelf life of 6–9 months and after that time the composition will not cure.

Accordingly, it was highly unexpected to find a composition that would have an acceptable shelf life by combining in said second mixture with the acyloxy functional silane instead of the tin salt from 0.1 to 5 parts by weight of a catalyst selected from a class consisting of zinc salts of carboxylic acid and zirconium salts of carboxylic acid and mixtures thereof. Preferably there is used from 0.5 to 3 parts by weight of such salts. The preferred catalysts are of course zinc octoates or zirconium octoate.

The only disadvantage with such a composition was that while it had a good shelf life that is, it had a shelf life that would vary anywhere from 18 months–27 months, nevertheless it had a tack-free time that was long. Thus, the composition could have a tack-free time of anywhere from 30 minutes to 60 minutes with the foregoing use of the zirconium salt or the zinc salt in place of the tin salt in the composition. If this is acceptable, then the zirconium salt and the zinc salt or mixtures thereof can be utilized as catalysts in the instant composition in place of the traditional tin salts the composition will have a good shelf life although longer than normal tack-free time.

It should be pointed out that the compositions of the prior art, that is the low modulus compositions of the prior art containing a tin salt therein had a lengthening of tack-free time after the 6–9 months of storage to the point where permanent residual surface tack was present after several days cure, that is the composition would not become tack-free except after a very long period of time. This is not the case with the instant composition utilizing zirconium salts or zinc salts. After 30 minutes, 60 minutes or at the most 2 hours, the compositions do become tack-free and the compositions do cure and do have a shelf stability in the range of 18 months–27 months.

It should also be noted that the prior art composition using the low modulus composition, that is the low modulus prior art composition utilizing tin salts as a catalyst would after storage beyond the 9 month period would have a decrease of total cure so that the material even after a 24 hour cure had a putty like consistency and pressure applied to the material caused permanent deformation. Initially, this effect was the notice of loss Shore A Hardness. In the latter stages of aging, the putty-like consistency would remain even after a one-month time at ambient conditions, that is the composition was curing so slowly that it appeared it would never cure.

The low modulus compositions of the instant case with zirconium and zinc salts in them in the above concentrations will cure within 24 hours even after a 9 month period in spite of the fact that the tack-free time may be as long as 1 hour.

It should be noted that in the second mixture of the catalyst there is preferably used anywhere from 60 to 100 parts by weight of the crosslinking agent and more preferably from 80 to 100 parts by weight of the crosslinking agent with from generally 0.1 to 5 parts and more preferably 0.5 to 3 parts by weight of the catalyst which is selected from zinc salts and the zirconium salts of carboxylic acid.

Further, in a more preferred embodiment of the instant case, there is utilized a co-catalyst system with the cross-linking agent, wherein the co-catalyst system contains from 0.1 to 5 parts by weight of an alkyl tin salt of a carboxylic acid and from 0.001 to 0.4 parts by weight of a co-catalyst selected from the class consisting of a zinc salt of a carboxylic acid and a zirconium salt of a carboxylic acid. More preferably, there is utilized as a co-catalyst in the system from 0.01 to 0.2 parts by weight of the zinc salt or the zirconium salt of carboxylic acid with from 0.1 to 1 parts by weight of a dialkyl tin salt of carboxylic acid with the alkyl group having 1 to 2 carbon atoms. The co-catalyst system of the tin salt with the zirconium or zinc salt is preferred over single catalyst system of the zirconium salt or the zinc salt since the co-catalyst system results in a composition which has good cure after storage varying from 18 months to 27 months with a tack-free time of 15 to 20 minutes. The composition without the combination or co-catalyst system of both the zinc or zirconium salt in combination with a dialkyl tin salt results in a composition with a good shelf life that will produce a good cure after storage for a period of time of 18–27 months, but will have a prolonged tack-free time of 30 minutes to 60 minutes or more. The composition with a co-catalyst system of the tin salt in combination with the zirconium salt or zinc salt will have a good shelf life, that is, it will have a good cure at periods of storage of as much as 18 months or as much as 27 months and will also have a short tack-free time of 15 minutes to 30 minutes.

A less preferred tin salt that can be utilized in combination with the zinc salt or zirconium salt is for instance dibutyltindialurate. However, the tin salt that is preferred in the instant compositions is one which has a dialkyl group which is a dialkyl tin soap of a carboxylic acid in which the dialkyl group is selected from dimethyl and the carboxylic acid portion contains anywhere from 2 to 22 carbon atoms and is most preferably neodecanoate.

Accordingly, the most preferred tin salt is dimethyl tin neodecanoate as the tin salt in combination with the zinc salt or the zirconium salt in the co-catalyst system of the instant invention.

Accordingly, to prepare the compositions of the instant case, the co-catalyst system or the catalyst system is mixed with the acyloxy functional silane and the second mixture is then mixed at a concentration of anywhere from 1 to 20 parts by weight per 100 parts by weight of the first mixture and the entire mixture is then packed in a moisture-proof container. Such a composition is maintained in the anhydrous state until it is desired to cure the composition. Then the composition is applied as a sealant in whatever manner it is desired and exposed to atmospheric moisture to cure to form an elastomeric silicone sealant.

It should be noted that even though the composition is disclosed and claimed in the form of mixing two mixtures, the claims in the disclosure of the instant case are directed to a one-component RTV system. All of the ingredients are mixed together into a single mixture and stored as such. When it is desired to utilize the composition or convert it to a silicone elastomer, it is simply exposed to atmospheric moisture either by squeezing from a tube or being pushed put of a caulking tube, such that it is exposed at atmospheric moisture whereupon the acyloxy functional silane will hydrolyze and crosslink to a silicone elastomer.

It should be noted that the claim language in the specification discloses the formation of two mixtures which are mixed together to form the single component of the instant composition, since this is how the composition is prepared in practice and also to facilitate the description and recitation of the concentrations thereof of the ingredients. There are additional ingredients to the instant composition and specifically in the instant composition there are additional ingredients which are present to make the composition a low modulus composition.

As pointed out previously, there is desirably utilized a high viscosity silanol terminated diorganopolysiloxane base polymer in the instant composition so as to lower the modulus of the composition or increase the percent elongation. In the above composition and specifically to decrease the modulus of the composition, there is present in the first mixture of the one component composition of the instant case per 100 parts of the silanol terminated diorganopolysiloxane polymer of from 0 to 50 parts by weight of a plasticizer. Although any suitable plasticizer can be utilized in the practice of the present invention, preferably the plasticizer is a diorganopolysiloxane polymer of a viscosity varying from 10 to 5,000 centipoise at 25° C. where the organo groups are monovalent hydrocarbon radicals. Suitable plasticizers for use in the present invention are well known to those skilled in the art and, accordingly, will not be further discussed herein.

It should also be noted that the organo groups of such diorganopolysiloxane polymer plasticizer preferably are the same as the organo groups of the silanol base polymer.

It should also be noted that such diorganopolysiloxane polymer is triorganosilylendstopped. It is preferred that the diorganopolysiloxane polymer be strictly linear. However, up to 1% of trifunctionality and monofunctionality combined is permitted. Generally, there may be utilized from 1 to 50 parts by weight of the plasticizer diorganopolysiloxane polymer and more preferably there is utilized anywhere from 20 to 30 parts by weight of diorganopolysiloxane polymer per 100 parts of the silanol terminated diorganopolysiloxane polymer. Further, although the viscosity of the polymer can vary from 10 to 5,000 centipoise, it preferably varies anywhere from 10 to 500 centipoise at 25° c. The diorganopolysiloxane polymer of which the most preferable type for use in the present invention is a dimethylpolysiloxane polymer of a viscosity varying from 10 to 500 centipoise at 25° C. which is trimethylsiloxy endstopped and which is substantially a linear polymer can be produced by methods well known in the art. Thus, the polymer can be produced by simply hydrolyzing diorganodichlorosilanes with triorganochlorosilanes and separating the resulting fluid that is formed. It can be appreciated that such a fluid will not be completely linear and may have up to 1% of monofunctional siloxy units and trifunctional siloxy units. However, such units will not detract from the plasticizing effect of the diorganopolysiloxane polymer.

Accordingly, the use of the preferred plasticizer, that is the diorganopolysiloxane fluid, having triorganosiloxy endstopped units will decrease the modulus of the composition if utilized in the foregoing quantities. To further decrease the modulus of the composition there may be utilized in the base or first mixture per 100 parts by weight of the silanol terminated diorganopolysiloxane polymer of anywhere from 1–25 parts by weight more preferably 5–15 parts by weight of a chainstopping fluid having in it monofunctional siloxy units, difunctional siloxy units and trifunctional siloxy units. Thus, preferably the fluid is composed of $R_2^3$ SiO units $R_3^3$ SiO$_{0.5}$ units and $R^3$ SiO$_{1.5}$ units where the ratio of organosiloxy units and diorganosiloxy units varies from 0.11 to 1.4, inclusive and the ratio of the triorganosiloxy units and diorganosiloxy units varies from 0.02 to about 1.0, inclusive and $R^3$ is a monovalent hydrocarbon radical. It should be noted the term $R^3$ being a monovalent hydrocarbon radical intended to include both monovalent hydrocarbon radicals and halogenated monovalent hydrocarbon radicals such as 3, 3, 3 trifluoropropyl. The groups for which $R^3$ radical may stand for is much the same as given before in the definition of the organo groups and the $R^2$ groups for the silanol terminated diorganopolysiloxane polymer which is the base polymer in the instant compositions. Such a polymer composed of monofunctional, difunctional and trifunctional siloxy units will contain anywhere from 0.1 to 8% by weight of hydroxy radicals.

A primary purpose for including such ingredients is that it acts as an adhesion promoter and allows the cured composition to adhere to various types of substrates with better adhesion than would be the case if it was not utilized.

The production of such fluid is also well-known in the art and generally comprises hydrolyzing the appropriate quantities of diorganodichlorosilanes with monoorganotrichlorosilanes and triorganochlorosilanes in water and then separating and purifying the resulting fluid that is formed. An example of the foregoing fluid composed of the monofunctional siloxy units and difunctional siloxy units and trifunctional siloxy units for use in one part RTV Compositions is disclosed in Beers U.S. Pat. No. 3,382,205, which is incorporated into the present case by reference. Use of such fluid to improve the shelf life of one component acyloxy functional silane RTV compositions is disclosed in this patent. However, the use of such fluid in combination with the other fluids and modifications of the instant case to both lower the modulus of the composition and increase the shelf life is not disclosed in the above Beers Patent.

However, this increase in tensile strength and decrease in modulus is more than offset by the other ingredients and modifications disclosed above to result in a low modulus one component RTV composition with the desired modulus and the desired shelf life. Finally, there is utilized an adhesion promoter or an ingredient which serves primarly as an adhesion promoter in the instant composition.

Accordingly, in the second mixture or the catalyst mixture there is present anywhere from 5 to 40 parts by weight of an adhesion promoter which is preferably a ditertiaryalkoxydiacyloxy functional silane. More preferably, there is utilized anywhere from 10 to 30 parts by weight of the ditertiaryalkoxydiacyloxy functional silane. More broadly, there may be utilized a dialkoxydiacyloxy functional silane as the adhesion promoter. However, it has been found that the ditertiaryalkoxydiacyloxy functional silanes are more effective as adhesion promoters in the instant compositions than is the case with the plain dialkoxysilane ingredients or additives.

Preferably, there is utilized ditertiarybutoxydiacytoxysilane as the adhesion promoter in the instant composition which is utilized in the concentration of anywhere from 10 to 30 parts by weight based on 60–100 parts by weight of the acyloxy functional silane cross-linking agent whose formula was given previously. This adhesion promoter is disclosed in Kulpa U.S. Pat. No. 3,296,161 which is incorporated into the present case by reference.

The instant disclosure particularly exemplifies and illustrates the use of such an adhesion promoter in one component acyloxy functional RTV Composition and the instant case is not limited to such adhesion promoters. There can be utilized other adhesion promoters in the instant composition. It can be appreciated also there can be utilized other plasticizers other than the triorganosilylendstopped diorganopolysiloxane polymers which are utilized as plasticizers in the instant case. In addition, there can be utilized other chainstopping fluids other than the fluid composed of monofunctional siloxy units and difunctional siloxy units and trifunctional siloxy units, as disclosed in the above specification. The above ingredients and additives have been specified since that results in a composition with competitive low modulus properties, which has a good shelf life that has a good cure after periods of time of storage of as long as 18 months or as long as 27 months and in which the foregoing catalyst, that is zinc salt or zirconium salt catalyst are utilized by themselves or more preferably the tin catalyst is used in combination with the zirconium salt and zinc salt in the co-catalyst system which is the preferred system of the instant case.

It should be noted that while variations may be made in the above composition, it is the above composition with the ingredients defined above both in the broad sense and in the more limiting sense that discloses a one component RTV low modulus composition with acceptable shelf life in periods of time varying from 18 months–27 months of storage.

Accordingly, even though a good many of the additives of the instant case are disclosed for utilization in one component RTV compositions by the prior art, it was not disclosed by the prior art the optimum combination of ingredients of the instant case for producing a composition both of low modulus and good tensile strength properties and a composition having good shelf life after a period of storage of 18 months–27 months after manufacture and having a good cure after that time.

The Examples below are given for the purpose of illustrating the present invention and are not given for any purpose or reason to set limits or definitions as to the extent of the instant invention or the extent of the instant claims. All parts in the examples are by weight unless specified otherwise.

EXAMPLE I

There was prepared base compounds X, 2X and 3X comprising taking a dimethylpolysiloxane polymer which was silanol stopped and which had the viscosity shown in the table below (Table I) and there was mixed with it the stated quantities of fumed silica treated with octamethylcyclotetrasiloxane, the dimethyl polysiloxane oil, which is trimethylsiloxy endstopped of 100 centipoise viscosity at 25° C. There was added to the mixture the stated quantities of such an oil and in addition there was added to the mixture the silicone oil composed of trimethylsiloxymonofunctional siloxy units, difunctional siloxy units and monomethyltrifunctional siloxy units which silicone fluid had a 0.5 weight percent hydroxy content as indicated in Table I below. The foregoing types of ingredients were combined in the quantities set forth in Table I below. To the base compound there was added the amount of the catalyst and the concentration of the catalyst in the second mixture of the crosslinking agent, adhesion promoter and catalyst ingredients as set forth in Table I below. The compositions had the following properties as set forth in Table I below.

TABLE I

Achievement of Low Modulus Characteristics, and Improved Toughness

| Factor (Tensile Product). | Parts by Weight (pbw) | | |
|---|---|---|---|
| | X | 2X | 3X |
| A. Base Compound | | | |
| A dimethyl silanol stopped polymer viscosity at 25° C. | 10,000 | 100,000 | 100,000 |
| pbw level | 100.pbw | 100.pbw | 100.pbw |
| Fumed silica treated with octamethylcyclotetrasiloxane | 20.pbw | 18.5pbw | 18.5pbw |
| Dimethylpolysiloxane oil of 100 centipoise at 25° C. | — | 25.pbw | 25.pbw |
| Silicone oil composed of (CH₃)₃ | | | |

TABLE I-continued

|  |  |  |  |
|---|---|---|---|
| $SiO_{0.5}$ units | 15.pbw | 8.pbw | 8.pbw |
| $(CH_3)_2SiO$ units and $CH_3SiO_{1.5}$ units with 0.5 wt. % hydroxy groups |  |  |  |
| B. Catalyst |  |  |  |
| Amount of catalyst mixture per 100 pts of base - Level (pbw on base) | 4.2 | 3.9 | 4.2 |
| Formula |  |  |  |
| Methyltriacetoxysilane | 80.pbw | 80.pbw | 80.pbw |
| Ditertiarybutoxydiacetoxysilane | 20.pbw | 20.pbw | 20.pbw |
| Dibutyl tin dilaurate | 0.60pbw | 0.60pbw | — |
| Dimethyl tin neodecanoate | — | — | 0.525pbw |
| Zirconium octoate (12% Zr) | — | — | 0.120pbw |
| C. Properties |  |  |  |
| Application Rate, gm/min. | 270. | 74. | 100. |
| Tack-free Time, minutes | 15. | 35. | 20. |
| Cure Condition 24 hrs./RT | Good | Good | Good |
| ASTM Sheet Physicals |  |  |  |
| Shore A | 34 | 17 | 20 |
| Tensile, psi | 350 | 300 | 360 |
| Elongation, % | 400 | 930 | 860 |
| Tensile Product ($\times 10^{-3}$) | 144. | 279. | 310. |
| Secant Modulus, psi |  |  |  |
| 0.25 in./in. | 232. | — | 136. |
| 1.00 in./in. | 122. | — | 60. |
| 3.00 in./in. | — | — | 39. |
| D. 180° Peel Adhesion | 10 day Room Temperature Cure | | |
| Note: - All values - (lb/in.)/ (% Cohesive Failure) |  |  |  |
| Substrate |  |  |  |
| Anodized Aluminum | 17/<5% | 45/15% | 75/85% |
| 304 Stainless Steel | 71/100% | 70/60% | 72/100% |
| E. 180° Peel Adhesion | 10 day/Room Temperature Cure plus 7 day/Room Temperature/$H_2O$ immersion | | |
| Note: - All values (lb. per inch)/ (% Cohesive Failure) |  |  |  |
| Substrate |  |  |  |
| Anodized Aluminum | <2/0% | 6/0% | >30/100% |
| 304 Stainless Steel | <2/0% | 60/60% | >30/100% |
| F. Accelerated Aging Data |  |  |  |
| Note: - All Values: Tack-free Time/Cure Condition at 24 hrs. |  |  |  |
| 100° C. Accelerated Aging |  |  |  |
| Time (hours) |  |  |  |
| 24 | 15 min/good | — | — |
| 32 | — | >60 min/poor | 20'/good |
| 48 | —/good | — | — |
| 70 | 30 min/good | — | — |

The values in Table I above indicate the composition with the lowest modulus and a good shelf life or a good rate of cure after accelerated aging only when the catalyst system of the instant case was utilized. There was obtained a system with low modulus, good tensile properties and good curing after aging only with the ingredients and the catalyst system of the instant case was utilized in the composition. There was prepared a performance comparison of Composition 3X with a prior art sealant. The results are as follows:

TABLE II

Comparison with High Performance Competitive Material

| Property | Prior Art Sealant | 3X |
|---|---|---|
| A. Application Properties |  |  |
| Application Rate, gm/min. | 146 | 102 |
| Tack-free Time, min. | 25 | 20 |
| B. Initial Physicals |  |  |
| Shore A Hardness | 25 | 20 |
| Tensile, psi | 190 | 360 |
| Elongation, % | 810 | 860 |
| Tensile Product ($\times 10^{-3}$) | 154 | 310 |
| C. Heat Aged Physicals (24 hr./480° F.) |  |  |
| Shore A Hardness | 51 | 43 |
| Tensile, psi | 100 | 170 |
| Elongation, % | 50 | 93 |
| Tensile Product ($\times 10^{-3}$) | 5.0 | 16.0 |

TABLE II-continued

| | | | |
|---|---|---|---|
| Weight Loss, % stability of material addition of 2 did not destabilize system | | 4.1 | 4.6 |

D. Adhesion, 180° Peel

| Substrate | Lb./in. | Failure (% Cohesive) | Lb./in. | Failure (% Cohesive) |
|---|---|---|---|---|
| Anodized Aluminum | 66 | 100 | 75 | 85 |

The results above indicate the Composition 3X, the composition of the instant case has superior low modulus and cured properties with respect to the prior art sealant.

EXAMPLE II

There was prepared the base Compositions 4X, 5X, 6X, 7X and 8X as indicated in Table III below, comprising forming the base compound by mixing 100 parts by weight of silanol terminated dimethylpolysiloxane which was a blend of dimethylpolysiloxanes such that the blend had an end viscosity of 80,000 centipoise at 25° C. and such that the Composition 8X was a blend of silanol terminated dimethylpolysiloxanes that had an end viscosity of 95,000 centipoise at 25° C. To such silanol polymers there was added 15.5 parts by weight of fumed silica treated with octamethylcyclotetrasiloxane 22.0 parts by weight of a trimethylsiloxy endstopped dimethylpolysiloxane oil of 100 centipoise viscosity at 25° C. and 6.5 parts of a silicone oil fluid composed of trimethylmonofunctional siloxy units, dimethyldifunctional siloxy units and monomethyltrifunctional siloxy units in which the polymer contained 0.5 weight percent of hydroxy groups. To the above base compounds there was added the amount of catalyst mixture as well as ingredients of the catalyst mixture shown in Table III below. The results of initial cure and accelerated aging cure to determine shelf life of the compositions is indicated in Table III below.

there was added the amount of catalyst mixture and types of ingredients and amounts of ingredients in the catalyst mixture shown in Table IV below. The compositions, one of which is the 3X Composition of Example I as compared with the slightly different composition, gave the following tack-free time and cure rates and cures upon initially being cured and upon being cured after accelerated aging as indicated in Table IV below.

TABLE III

Evaluation of Promoter Systems - Parts by weight (pbw)
Effect of Zirconium, zinc and dimethyl tin soap promoters.

| I. Formulation | | | | | |
|---|---|---|---|---|---|
| A. Base Compound | 4X | 5X | 6X | 7X | 8X |
| Silanol terminated dimethylpolysiloxane (blend to 80,000 cps. at 25° C.) | 100.pbw | 100.pbw | 100.pbw | 100.pbw | 100pbw of blend of 95,000 cps. at 25° C. |
| Fumed silica treated with octamethylcyclotetrasiloxane | 15.5pbw | → | → | → | → |
| Dimethylpolysiloxane oil of 100 centipoise visc. | 22.0pbw | → | → | → | → |
| Silicone oil compound of $(CH_3)_3SiO_{0.5}$ units $(CH_3)_2SiO$ units and $(CH_3)SiO_{1.5}$ units with 0.5 weight % hydroxy groups | 6.5pbw | → | → | → | → |
| B. Catalyst | | | | | |
| Methyltriacetoxysilane | 80.0pbw | 100.0pbw | 80.0pbw | 80.pbw | 80.pbw |
| Ditertiarybutoxy><diacetoxysilane | 20.0pbw | — | 20.pbw | 20.pbw | 20.pbw |
| Zirconium Octoate (12% Zr) | — | — | — | 1.50 | — |
| Zinc Octoate (16%) | — | — | — | — | 1.0 |
| Dimethyl Tin Neodecanoate | — | — | 1.0 | — | — |
| DBT (Dibutyl Tin Dilaurate) | 0.60 | 1.20 | — | — | — |
| Total Catalyst Level (Wt. % per 100 parts by weight of above base compound | 5.0 | 5.5 | 6.0 | 6.0 | 5.5 |
| II. Accelerated Age Test Results | | | | | |
| A. Initial Cure | | | | | |
| Tack-free time, minutes | 20 | 25 | 20 | 60 | 30 |
| Cure Condition at 24 hrs. | good cure | good cure | good cure | good cure | good cure |
| B. Accelerated Age, 24 hrs. at 100° C. | | | | | |
| Tack-free time, minutes/hours | >>1 hr. | >4 hrs. partial | >2 hrs. | 24 hr/100° C. 40 min. | 72 hr/100° C. 40 min. 30 min. |
| Cure condition at 24 hours | no cure | cure/poor | Fair cure | good cure | good cure good cure |

The results of Table III indicate that Compositions which were catalyzed only with tin soaps had good initial cure and good initial tack-free time, but had very poor cure upon accelerated aging while compositions cured solely with zirconium octoate, that is 7X or zinc octoate, that is 8X had long initial tack-free time, but good initial cures and had upon accelerated aging long tack-free time that is 40 minutes or so, but good cures after such accelerated aging. The results of Table III substantiate the zinc octoate and zirconium octoate, that is zinc salts and zirconium salts or carboxylic acid were good catalyst for the low modulus compositions of the instant case and provided good shelf life to the composition.

EXAMPLE III

There was prepared a base compound comprising 100 parts by weight of a silanol terminated dimethylpolysiloxane oil fluid of 112,000 centipoise viscosity at 25° C., 18.5 parts by weight of a fumed silica treated with octamethylcyclotetrasiloxane, 25 parts by weight of a trimethyl siloxy endstopped dimethylpolysiloxane oil of 100 centipoise viscosity at 25° C. and 8 parts by weight of a silicone oil composed of trimethylmonofunctional siloxy units, dimethyldifunctional siloxy units and monomethyltrifunctional siloxy units with 0.5 weight percent of hydroxy groups. To the resulting mixture

TABLE IV

Effect of Combinations of Dimethyl Tin Neodecanoate and Zinc or Zirconium Soap - Parts by Weight (pbw)

| 1. Formulation | | |
|---|---|---|
| A. Base Compound (All Formulations) | | |
| Silanol terminated dimethylpolysiloxane 112,000 cps. viscosity at 25° C. | 100pbw | |
| Fumed silica treated octamethylcyclotetrasiloxane | 18.5pbw | |
| Dimethylpolysiloxane oil of 100 centipoise viscosity at 25° C. | 25.0pbw | |
| Silicone oil composed $(CH_3)_3SiO_{0.5}$ units, $(CH_3)_2SiO$ units and $(CH_3)SiO_{1.5}$ units 0.5 weight % of hydroxy groups | 8.0pbw | |
| B. Catalyst | | |
| 1. Formula | 9X | 3X |
| Methyltriacetoxysilane | 80. | 80. |
| Ditertiarybutoxy><diacetoxysilane | 20. | 20. |
| Zirconium Octoate (12% Zr) | — | 0.120 |
| Zinc Octoate | 0.075 | — |
| Dimethyl tin neodecanoate | 0.525 | 0.525 |
| 2. Level Wt. % of catalyst mixtures per 100 pts of Base Compound | 5.0 | 5.0 |
| 2. Properties - Accelerated Age | | |
| Initial | | |
| Tack-free time, minutes | 15 | 20 |
| Cure Condition | good cure | good cure |
| Accelerated Age, 32 hrs/100° C. | | |
| Tack-free time, minutes | 14 | 20 |
| Cure Condition | good | good |

TABLE IV-continued

|  | cure | cure |
| --- | --- | --- |

The above results in Table IV show that the low modulus compositions of the instant case which were cured with the combination of zinc octoate and dimethyl tin neodecanoate or zirconium octoate or a combination of zirconium octoate and dimethyl tin neodecanoate resulted in compositions with good tack-free times, that is tack-free times in the neighborhood of 15–20 minutes and good cures both on being cured initially upon being prepared or upon being cured after accelerated aging indicating that both compositions had good shelf life. The above results indicate that there is obtained good low modulus compositions having good tensile properties as well as compositions having good acceptable tack-free times and long shelf life.

I claim:

1. A low modulus room temperature vulcanizable silicone rubber composition comprising:
   (A) 100 parts by weight of a silanol terminated diorganopolysiloxane polymer having a viscosity ranging from 50,000 centipoise to 350,000 centipoise at 25° C. and where the organo groups are monovalent hydrocarbon radicals; and
   (B) 1 to 20 parts by weight of a catalyst mixture per 100 parts by weight of (A), said catalyst mixture comprising:
      (1) 60 to 100 parts by weight of an acyloxy functional silane of the formula $$R-Si-(OCOR^1)_3$$

where R and $R^1$ are monovalent hydrocarbon radicals and
      (2) a co-catalyst comprising:
         (a) 0.1 to 5 parts by weight of an alkyl tin salt of a carboxylic acid and
         (b) 0.001 to 0.4 parts by weight of a zinc salt of a carboxylic acid, a zirconium salt of a carboxylic acid or mixture thereof.

2. The composition of claim 1 wherein ingredient (A) further comprises 5 to 100 parts by weight of a filler.

3. The composition of claim 2 wherein the filler is selected from the class consisting of fumed silica and precipitated silica.

4. The composition of claim 2 wherein the filler is selected from the class consisting of titanium dioxide, zirconium silicate, silica aerogel, iron oxide, diatomaceous earth, glass fibers, polyvinyl chloride, ground quartz, lithopone, zinc oxide, calcium carbonate, magnesium oxide, chromic oxide, zirconium oxide, aluminum oxide, alpha quartz, calcined clay, carbon, graphite, cotton and synthetic fibers.

5. The composition of claim 2 wherein the filler is treated with a cyclotetrapolysiloxane.

6. The composition of claim 1 wherein ingredient (A) further comprises 1 to 50 parts by weight of a plasticizer.

7. The composition of claim 6 wherein the plasticizer is a diorganopolysiloxane having a viscosity ranging from 10 to 5000 centipoise at 25° C.

8. The composition of claim 7 wherein the plasticizer is dimethylpolysiloxane.

9. The composition of claim 1 wherein ingredient (A) further comprises 1 to 25 parts by weight of a chainstopping fluid having $(R^3)_2SiO$ units, $(R^3)_3SiO_{0.5}$ units and $R^3SiO_{1.5}$ units, where the ratio of organosiloxy units to diorganosiloxy units varies from approximately 0.11 to 1.4 and the ratio of triorganosiloxy units to diorganosiloxy units varies from about 0.02 to 1.0, and where $R^3$ is a monovalent hydrocarbon radical.

10. The composition of claim 1 wherein ingredient (B) further comprises 5 to 40 parts by weight of an adhesion promoter.

11. The composition of claim 10 wherein the adhesion promoter is a ditertiaryalkoxydiacyloxy functional silane.

12. The composition of claim 11 wherein the adhesion promoter is ditertiarybutoxydiacetoxysilane.

13. The composition of claim 1 wherein the tin salt is dibutyltindilaurate.

14. The composition of claim 1 wherein the tin salt alkyl portion is methyl and the carboxylic acid portion has from 2 to 22 carbon atoms.

15. The composition of claim 14 wherein the tin salt is dimethyl tin neodecanoate.

16. The composition of claim 1 wherein the zinc salt is zinc octoate.

17. The composition of claim 1 wherein the zirconium salt is zirconium octoate.

18. A process for forming a low modulus room temperature vulcanizable silicone rubber composition comprising the steps of:
   (a) mixing:
      (A) 100 parts by weight of a silanol terminated diorganopolysiloxane polymer having a viscosity ranging from 50,000 centipoise to 350,000 centipoise at 25° C. and where the organo groups are monovalent hydrocarbon radicals; and
      (B) 1 to 20 parts by weight of a catalyst mixture per 100 parts by weight of (A), said catalyst mixture comprising
         (1) 60 to 100 parts by weight of an acyloxy functional silane of the formula $$R-Si(OCOR^1)_3$$

where R and $R^1$ are monovalent hydrocarbon radicals and
         (2) a co-catalyst comprising:
            (a) 0.1 to 5 parts by weight of an alkyl tin salt of a carboxylic acid and
            (b) 0.001 to 0.4 parts by weight of a zinc salt of a carboxylic acid, a zirconium salt of a carboxylic acid, or mixtures thereof.
   (b) curing the mixture in the presence of atmospheric moisture.

19. The process of claim 18 wherein ingredient (A) further comprises 5 to 100 parts by weight of a filler.

20. The process of claim 19 wherein the filler is selected from the class consisting of fumed silica and precipitated silica.

21. The process of claim 19 wherein the filler is selected from the class consisting of titanium dioxide, zirconium silicate, silica aerogel, iron oxide, diatomaceous earth, glass fibers, polyvinyl chloride, ground quartz, lithopone, zinc oxide, calcium carbonate, magnesium oxide, chromic oxide, zirconium oxide, aluminum oxide, alpha quartz, calcined clay, carbon, graphite, cotton and synthetic fibers.

22. The process of claim 19 wherein the filler is treated with a cyclotetrapolysiloxane.

23. The process of claim 18 wherein ingredient (A) further comprises 1 to 50 parts by weight of a plasticizer.

24. The process of claim 23 wherein the plasticizer is a diorganopolysiloxane having a viscosity ranging from 10 to 5000 centipoise at 25° C.

25. The process of claim 24 wherein the plasticizer is dimethylpolysiloxane.

26. The process of claim 18 wherein ingredient (A) further comprises 1 to 25 parts by weight of a chainstopping fluid having $(R^3)_2SiO$ units, $(R^3)_3SiO_{0.5}$ units $R^3SiO_{1.5}$ units, where the ratio of organosiloxy units to diorganosiloxy units varies from approximately 0.11 to 1.4 and the ratio of triorganosiloxy units to diorganosiloxy units varies from about 0.02 to 1.0, and where $R^3$ is a monovalent hydrocarbon radical.

27. The process of claim 18 wherein ingredient (B) further comprises 5 to 40 parts by weight of an adhesion promoter.

28. The process of claim 27 wherein the adhesion promoter is a ditertiaryalkoxydiacyloxy functional silane.

29. The process of claim 28 wherein the adhesion promoter is ditertiarybutoxydiacetoxysilane.

30. The process of claim 18 wherein the tin salt is dibutyltindilaurate.

31. The process of claim 18 wherein the tin salt alkyl portion is methyl and the carboxylic acid portion has 2 to 22 carbon atoms.

32. The process of claim 31 wherein the tin salt is dimethyltinneodecanoate.

33. The process of claim 18 wherein the zinc salt is zinc octoate.

34. The process of claim 18 wherein the zirconium salt is zirconium octoate.

* * * * *